United States Patent
Mazur

(10) Patent No.: US 9,404,475 B2
(45) Date of Patent: Aug. 2, 2016

(54) SYSTEM AND METHODOLOGY FOR WIND COMPRESSION

(71) Applicant: Regenedyne LLC, Sierra Vista, AZ (US)

(72) Inventor: Edward Mazur, Sierra Vista, AZ (US)

( * ) Notice: Subject to any disclaimer, the term of this patent is extended or adjusted under 35 U.S.C. 154(b) by 0 days.

(21) Appl. No.: 14/691,695

(22) Filed: Apr. 21, 2015

(65) Prior Publication Data

US 2015/0226182 A1  Aug. 13, 2015

Related U.S. Application Data

(63) Continuation of application No. 14/107,922, filed on Dec. 16, 2013, now Pat. No. 9,133,821, which is a continuation of application No. 13/607,167, filed on Sep. 7, 2012, now Pat. No. 8,608,425, which is a continuation of application No. 12/215,232, filed on Jun. 26, 2008, now abandoned.

(51) Int. Cl.

| | | |
|---|---|---|
| F01D 1/02 | (2006.01) | |
| F01D 9/00 | (2006.01) | |
| F03B 1/04 | (2006.01) | |
| F03B 3/16 | (2006.01) | |
| F03D 1/04 | (2006.01) | |
| F03D 11/00 | (2006.01) | |
| F03D 3/04 | (2006.01) | |
| F04D 29/44 | (2006.01) | |
| F04D 29/54 | (2006.01) | |
| F03D 1/00 | (2006.01) | |

(Continued)

(52) U.S. Cl.
CPC ............ *F03D 3/0409* (2013.01); *F03D 1/005* (2013.01); *F03D 3/005* (2013.01); *F03D 3/0427* (2013.01); *F03D 7/0204* (2013.01); *F03D 7/0224* (2013.01); *F03D 9/001* (2013.01); *F03D 9/002* (2013.01); *F03D 11/0008* (2013.01); *F03D 11/02* (2013.01); *F03D 11/04* (2013.01); *F05B 2240/13* (2013.01); *Y02E 10/72* (2013.01); *Y02E 10/74* (2013.01)

(58) Field of Classification Search
CPC ..... F03D 3/0427; F03D 9/002; F03D 3/0409; F03B 13/00; F03B 3/00; B61D 43/00
USPC .................................................... 415/4.2, 191
See application file for complete search history.

(56) References Cited

U.S. PATENT DOCUMENTS

| | | | | |
|---|---|---|---|---|
| 5,152,679 | A * | 10/1992 | Kanemitsu | F04D 19/048 417/423.4 |
| 6,984,899 | B1 * | 1/2006 | Rice | F03D 3/049 290/44 |
| 2005/0019163 | A1 * | 1/2005 | Heronemus | F03D 1/02 416/44 |

*Primary Examiner* — David S Blum
(74) *Attorney, Agent, or Firm* — Raymond Van Dyke; Van Dyke Law

(57) ABSTRACT

A wind compressor system having one or more wind turbines and a plurality of wind compressors located proximate the one or more wind turbines. The wind compressors optimize the energy created by the wind turbines by redirecting and converging the wind from the wind compressor to the wind turbines. Each of the wind compressors comprises an obstruction having a size and shape adapted to converge the wind currents by means of a Venturi effect toward the one or more turbines thereby increasing the velocity and force of the wind hitting the wind turbine. A plurality of transporters coupled to the wind compressors. The transporters configured to move at least one wind compressors to a location that maximizes the force of the wind encountered by the turbine.

20 Claims, 7 Drawing Sheets

(51) Int. Cl.
 *F03D 3/00* (2006.01)
 *F03D 9/00* (2016.01)
 *F03D 7/02* (2006.01)
 *F03D 11/02* (2006.01)
 *F03D 11/04* (2006.01)

SYSTEM AND METHODOLOGY FOR WIND COMPRESSION

RELATED PATENTS AND PATENT APPLICATIONS

The present application is a continuation of U.S. patent application Ser. No. 14/107,922, now U. S. Pat. No. 9,133,821, which is a continuation of U.S. patent application Ser. No. 13/607,167, now U.S. Pat. No. 8,608,425, which is a continuation of U.S. patent application Ser. No. 12/215,232, abandoned; is co-pending with pending U.S. patent application Ser. No. 14/107,951, which is a continuation of U.S. patent application Ser. No. 13/607,270, now U.S. Pat. No. 8,608,426; and is co-pending with U.S. patent application Ser. No. 13/854,736, which is a continuation of U.S. patent application Ser. No. 12/215,233, now U.S. Pat. No. 8,513,826, the disclosures of which are incorporated herein by reference.

FIELD OF INVENTION

The field of invention relates to a system for channeling wind to one or more wind turbines in order to increase the productivity of the wind turbines.

BACKGROUND OF THE INVENTION

Wind turbines harness the kinetic energy of the wind and convert it into mechanical or electric power. Traditional wind turbines have a horizontal spinning axis that allowed blades of the wind turbine to rotate around the axis. As wind engages the blades, the blades move around the horizontal spinning axis of the wind turbine. The relative rotation of the blades to the horizontal axis may then be converted into energy.

Wind turbines only capture wind that engages the blades. Thus, only the wind directly passing in line with the wind turbine is converted into energy.

SUMMARY OF THE INVENTION

In the method of this invention, the force of wind acting on a wind turbine is increased thereby increasing the resulting energy output of the wind turbine. This method is achieved by positioning one or more wind compressors proximate a first side of a wind turbine and one or more wind compressors proximate the second side of the wind turbine, where the second side is distal from the first side. The wind compressors comprise an obstruction configured to redirect a wind flow from each of the wind compressors toward the wind turbine. The one or more wind compressors should be arranged proximate to the wind turbine in a configuration that creates a Venturi effect on the wind flow aimed at the wind compressors so that the redirected wind flows converge toward the wind turbine at an increased velocity and force.

The wind directing system of this invention comprises one or more wind compressors which are proximate to a first side of the wind turbine and one or more wind compressors which are proximate a second side of the wind turbine. The second side is distal from the first side. Each of the wind turbines of this invention comprise an obstruction which is configured to redirect wind flow from each of the wind compressors toward the wind turbines so that the converged wind flow creates a Venturi effect. The redirected wind flow has an increased velocity and force. The system also comprises a plurality of transporters with one or more wind compressors coupled to at least one transporter. The transporters are configured to move at least one wind compressor to a location that maximizes the force of the wind encountered by the wind compressor and directed by the wind compressor to the wind turbine.

In one embodiment, the wind compressor system for directing wind toward one or more wind turbines of this invention comprises one or more riggings with a sail coupled to each one which is configured to engage and redirect the wind so that the wind converges toward the one or more wind turbines in a Venturi effect. A transporter is also coupled to the riggings and is configured to maintain a first location of the sail while the sail redirects wind toward the one or more wind turbines. The system also comprises a controller which is configured to move the transporter to a second location in response to a change in the wind direction.

This invention also entails a wind powered generator system for generating electrical power from wind power which comprises a vertical turbine rotor, a vertical turbine support, and one or more blades coupled to the turbine rotor which are configured to move the turbine rotor relative to the turbine support. One or magnet sets are located between the turbine support and the turbine rotor. There is also a space between a portion of the turbine rotor and the turbine support, where the space is created by the magnetic force from the one or more magnet sets. One or more generators are configured to generate electric power from the rotating movement of the turbine rotor. The one or more wind compressors are proximate to a first side of the turbine support and one or more compressors are also proximate to a second side of the turbine support, where the second side is distal from the first side. Each of the wind compressors have an obstruction which is configured to redirect wind flow from each of the wind compressors toward the turbine rotors so that the converged wind flow from the wind compressors creates a Venturi effect. The converged wind flow results in an increased velocity and wind force on the turbine rotors.

The method of this invention for generating electricity comprises attaching a set of dipolar magnets to a turbine rotor and a turbine support. In one aspect, the magnets are located between the turbine rotor and the turbine support, creating an opposing magnetic force that reduces friction and creates a space between the turbine rotor and the turbine support. As one or more blades engage with wind, the vertical turbine rotor is rotated relative to the turbein support. A generator converts the mechanical energy of the moving vertical turbine into electric power. One or more wind compressors are proximate to a first side of a turbine support and to a second side of the turbine support where the second side is distal from the first side. The wind compressors comprise an obstruction configured to redirect wind flow from each of the wind compressors towards the turbine rotor. The wind compressors proximate to the turbine support create a Venturi effect on the wind flow aimed at the wind compressors so that the redirected wind flow converges toward the turbine rotor at an increased velocity and force. The mechanical energy of the moving turbine rotor is converted into electric power by the use of a generator.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1A:
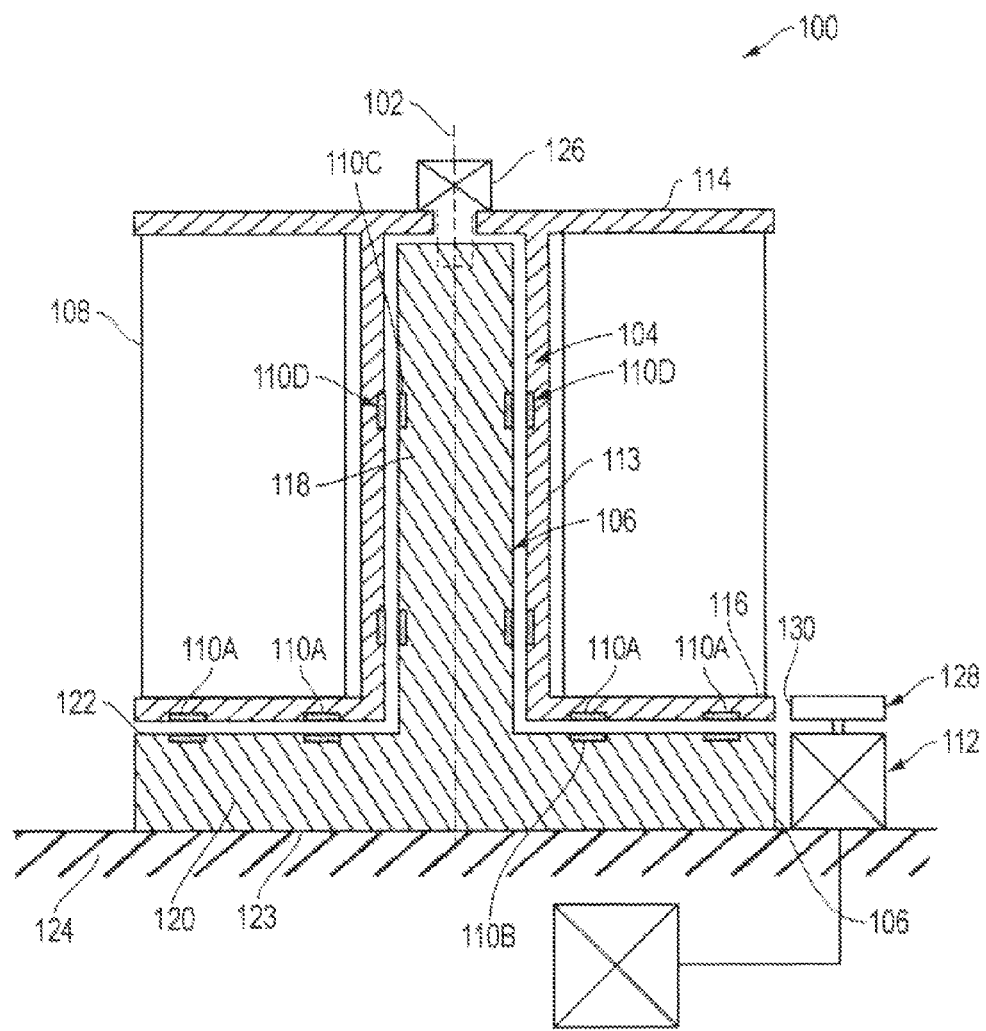
FIG. 1A is a schematic cross-sectional view of a wind turbine according to one embodiment of the present invention.

FIG. 1A is a schematic cross sectional view of a wind turbine 100, according to one embodiment. The wind turbine 100, as shown, is a vertical axis wind turbine. Therefore, a core axis 102 of the wind turbine 100 is substantially in a vertical plane relative to the Earth. The wind turbine 100 may have a turbine rotor 104 and a turbine support 106 within and concentric to the turbine rotor 104. The turbine rotor 104 rotates around the core axis 102 of the turbine support 106 in response to wind engaging one or more blades 108, shown schematically. The kinetic energy from the wind is captured by the blades 108 thereby rotating the turbine rotor 104. The turbine core support 106 may remain stationary as the turbine rotor 104 rotates around the axis 102. In order to reduce the effects of friction between the rotating turbine rotor 104 and the turbine support 106, one or more sets of magnets 110 are used to reduce the weight force of the turbine rotor 104 acting on the turbine support 106. A generator 112 may be located proximate the wind turbine 100 in order to convert the mechanical energy of the rotating turbine rotor 104 into electric power.

Figure 1B:
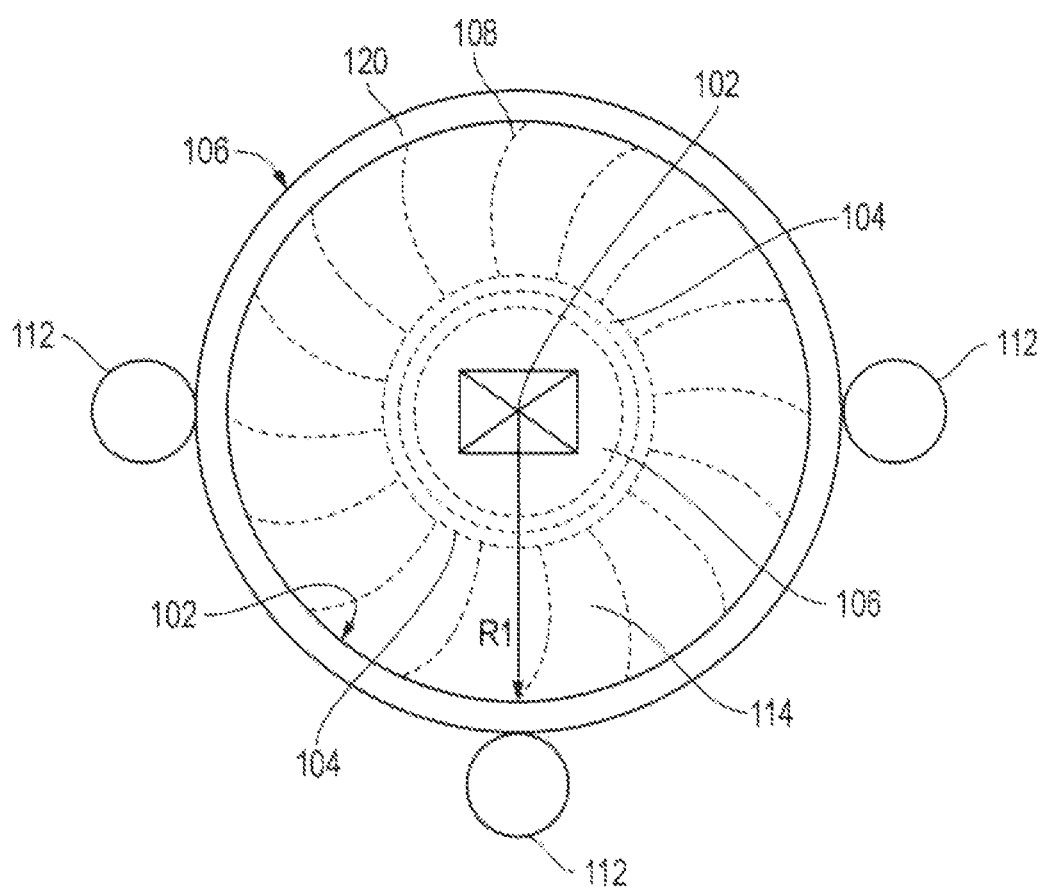
FIG. 1B is a schematic top view of a wind turbine according to one embodiment of the present invention.

The turbine rotor 104, as shown in FIG. 1A, comprises a central axis 113 that is substantially centered around the axis 102. The turbine rotor 104, may include a top 114 and a bottom 116 extending out from the central axis 113. As shown, the central axis 113 supports the top 114 and the bottom 116. The top 114 and/or the bottom 116, as shown, extends radially away from the central axis 113. In FIG. 1B a top view of the wind turbine 100 is shown. The top view shows the top 114 extending a first radius R1 away from the axis 102. The bottom 116 may extend the same distance as the top 114 from the axis 102; however, it should be appreciated that the distance the top 114 and bottom 116 extend from the axis 102 may vary depending on design conditions. The top 114, as shown in FIGS. 1A and 1B, extends over the top of a support shaft 118 of the turbine support 106; however, it should be appreciated that other suitable configurations for the top 114 may be used.

Figure 2:
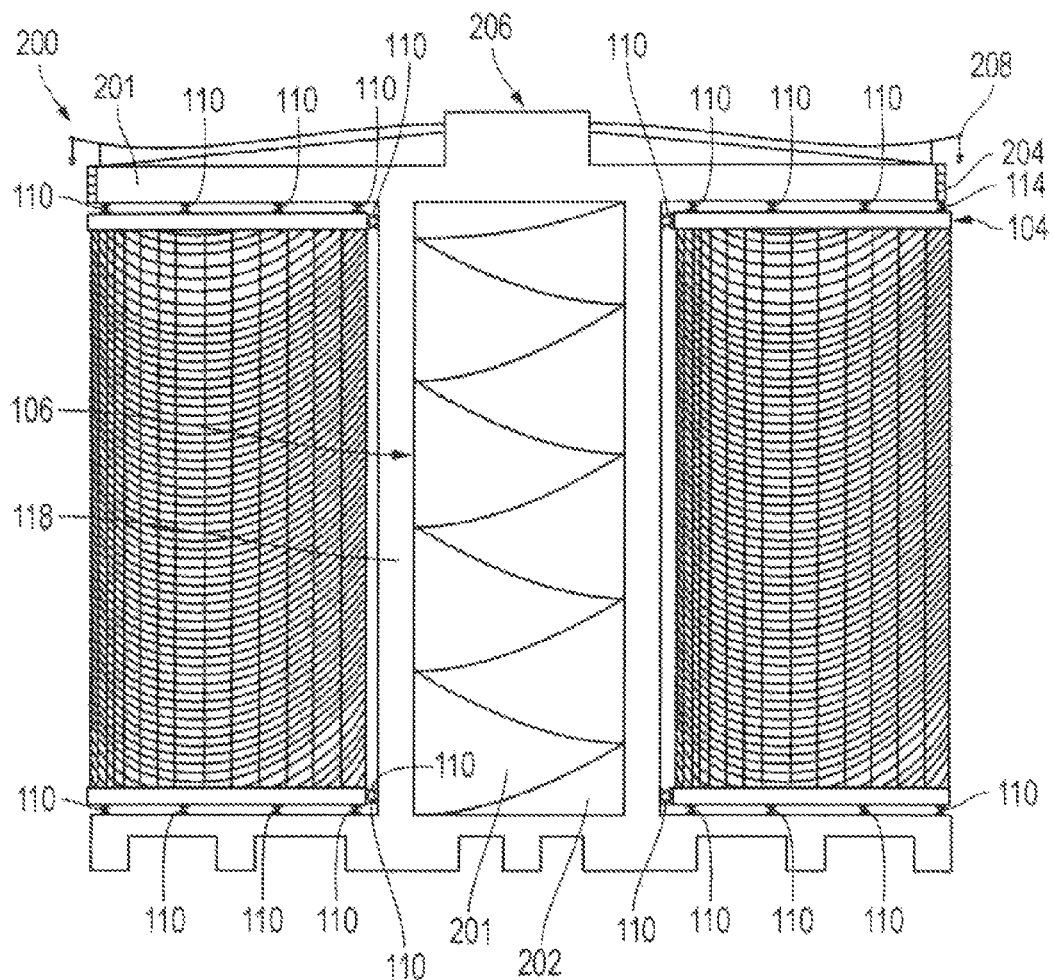
FIG. 2 is a schematic cross-sectional view of a wind turbine according to one embodiment of the present invention.

The turbine rotor 104 may have alternative designs to the one shown in FIG. 1. For example, the turbine rotor 104 may not cover the top of the support shaft 118, as shown in FIG. 2. Further, the turbine rotor 104 may simply include the top 114 and the bottom 116 and be held together by the blades 108. Further still, the top 114 and/or the bottom 116 may not be shaped in a circular pattern, but instead may extend as supports over each of the blades 108 in an effort to save money on materials and reduce the weight of the turbine rotor 104. The turbine rotor 104 may have any suitable design capable of supporting the blades 108 and rotating around the axis 102.

The bottom 116 of the turbine rotor 104 may include one or more of the magnets 110. The one or more magnets 110 located in the bottom 116 of the turbine rotor 104 provide an opposing force against one or more magnets 110 located on the turbine support 106. The opposing force created by the one or more magnets 110 reduces the weight load of the turbine rotor 104 on the turbine support 106, as will be discussed in more detail below.

The turbine support 106 may be any suitable shape capable of supporting the weight of the turbine rotor 104 and stabilizing the turbine rotor 104 as it rotates about the axis 102. The turbine support 106, as shown in FIG. 1A, includes a base 120 and the support shaft 118. The base 120 may rest under the bottom 116 of the turbine rotor 104. The base 120 typically acts as a support between a surface 124, such as the ground or bed rock, and the turbine rotor 104. The base 120 may include a platform 122 adjacent the turbine rotor 104 and a bottom member 123 adjacent the surface 124. The base 120 may be any suitable shape so long as the base is capable of supporting the weight of the turbine rotor 104.

Figure 3:
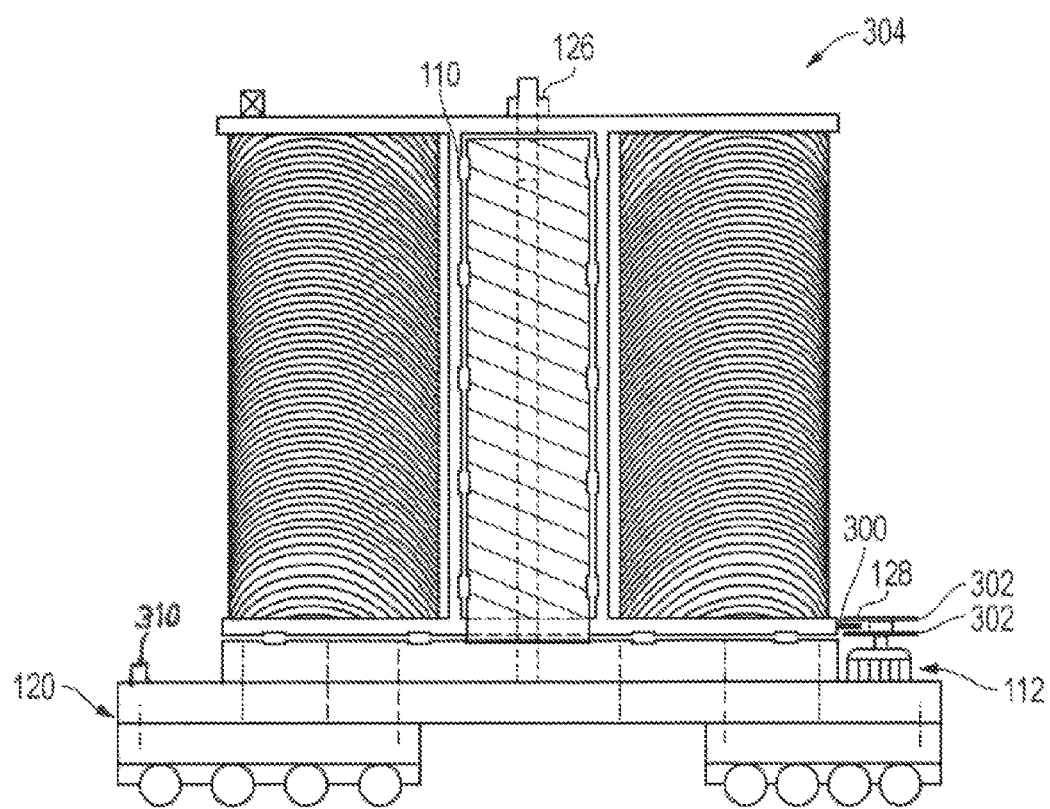
FIG. 3 is a schematic side view of a wind turbine according to one embodiment of the present invention.

The surface 124, as shown in FIG. 1A, is the ground; however, it should be appreciated that the surface 124 may be any suitable surface for supporting the base 120 including, but not limited to, a trailer, a boat, a rail car as illustrated in FIG. 3, a top of a building, a top of a parking garage, a top of a stadium, and the like.

The platform 122 typically provides the support for the right of the turbine rotor 104. The platform 122 may include one or more magnets 110B which provide an opposing force against the one or more magnets 110A located on the bottom 116 of the turbine rotor 104, as will be described in more detail below. The base 120 and/or the platform 122 may extend the same radial distance from the axis 102 as the turbine rotor 104. Alternatively, the base 120 may extend a shorter radial distance from the axis 102 than the turbine rotor 104, or, in another alternative embodiment, may extend a longer radial distance from the axis 102 than the turbine rotor 104. It should be appreciated that the platform 122 may be any suitable shape capable of providing a vertical support surface for the turbine rotor 104.

The support shaft 118 of the turbine support 106 may provide for stabilization of the turbine rotor 104. The support shaft 118, as shown in FIGS. 1A and 1B is located radially inside the central axis 113 of the turbine rotor 104. FIG. 1A shows the support shaft 118 as a substantially solid shaft which is slightly smaller than the interior of the central axis 113 of the turbine rotor 104. Alternatively, as shown in FIG. 2, the support shaft 118 may define an opening that allows for an interior access way 202. The support shaft 118 allows the turbine rotor 104 to rotate in response to the wind while preventing the turbine rotor 104 from moving substantially in the direction perpendicular to the core axis 102. The support shaft 118 may include one or more magnets 110C which provide an opposing force against one or more magnets 110D located on the central axis 113 of the turbine rotor 104. The magnet 110C located on the support shaft 118 may act to stabilize the turbine rotor as will be discussed in more detail below.

The wind turbine 100 may include a connector 126, shown schematically in FIGS. 1A and 3. The connector 126 may secure the turbine rotor 104 to the turbine support 106 while allowing the turbine rotor 104 to rotate. FIG. 1A shows the connector 126 as a pin type connection which is secured to the support shaft 118 and penetrates an opening in the top 114 of the turbine rotor 104. A head of the pin may rest on the top 114 of the turbine rotor 104. The opening may be large enough to not engage the pin as the turbine rotor 104 rotates about the turbine support 106. The head may simply provide an upward travel limit for the turbine rotor 104. Thus, typically the turbine rotor 104 may not engage the connector 126; however, in the event that the turbine rotor 104 lifts off of the turbine support 106, the head will stop it from becoming detached from the wind turbine 100. It should be appreciated that any suitable arrangement for securing the turbine rotor 104 to the turbine support 106 may be used.

The one or more sets of magnets 110C, 110D reduce friction between the turbine support 104 and the turbine rotor 106 by creating a space between the turbine support 104 and the turbine rotor 106. The magnets replace the role of roller bearings in prior wind turbines. The one or more magnets 110A, 110B positioned on the bottom 116 of the turbine rotor 104 and the platform 122 of the turbine support may include one or more levitation magnets and one or more stabilization magnets. The levitation magnets supply an opposing force between the bottom 116 of the turbine rotor 104 and the platform 122. The opposing force created by the levitation magnets may create a force on the turbine rotor 104 substantially opposite to a gravitational force on the turbine rotor 104. The levitation magnets can provide a large enough opposing force to lift the turbine rotor 104 off of the platform 122 thereby eliminating friction between the platform 122 and the turbine rotor 104. Specifically, a space may be created between the platform 122 and the bottom 116 of the turbine rotor 104 as a result of the opposing force. Alternatively, the opposing force created by the levitation magnets may only negate a portion of the gravitational force, so that the friction force between the platform 122 and the turbine rotor 104 is reduced.

The stabilization magnets 110D, 110C, as shown in FIG. 1A, are designed to provide an opposing force between the central axis 113 and the support shaft 118. The stabilization magnets may be located directly on the interior of the central axis 113 and the exterior of the support shaft 118. The stabilization magnets may maintain a space between the inner diameter of the central axis 113 and the outer diameter of the support shaft 118. Therefore, during rotation of the turbine rotor 104 there may be no friction between the central axis 113 of the turbine rotor 104 and the support shaft 118. It should be appreciated that other means of reducing the friction between central axis 113 and the support shaft 118 may be used including, but not limited to, a bearing.

Friction may be eliminated between the turbine rotor 104 and the turbine support 106 using both the levitation magnets and stabilization magnets. The one or more sets of magnets 110 may be any magnets suitable for creating an opposing force including but not limited to a permanent magnet, an electromagnet, permanent rare earth magnet, ferromagnetic materials, permanent magnet materials, magnet wires and the like. A permanent rare earth magnet may include samarium cobalt (SmCo) and/or neodymium (NdFEB). Further, the one or more magnets 110 may be arranged in any suitable manner so long as they reduce the friction between the turbine rotor 104 and the turbine support 106. FIGS. 1A, 2, and 3 show the one or more sets of magnets 110 as a series of permanent magnets spaced apart from one another; however, it should be appreciated that an electromagnet may be used in order to magnetize a portion of the turbine rotor 104 and the turbine support 106. Further, in an alternative embodiment, a portion of the turbine rotor 104 and the turbine support 106 may be magnetized to provide the opposing force. Thus in an alternative embodiment, the entire platform 122 and/or base 120 may be magnetized to provide an opposing force on the bottom 116 of the turbine rotor 104 which may also be magnetized.

The blades 108 may be any suitable blade capable of converting the kinetic energy of the wind into mechanical energy. In one embodiment, the blades 108 are made from a thin metal material, however, it should be appreciated that blades may be any suitable material including, but not limited to, a polycarbon, a fabric, a synthetic material.

The blades 108 may be fixed to the turbine rotor 104 in a static position. Alternatively, the blades 108 may be moveably attached to the turbine rotor 104. For example, a connection between the blades 108 and the turbine rotor 104 may allow the angle of the blades 108 to adjust in relation to the turbine rotor 104. The angle may adjust manually or automatically in response to the wind conditions at the location.

The turbine rotor 104 provides mechanical energy for the one or more generators 112 as the turbine rotor 104 rotates about the axis 102. In one embodiment, a generator gear 128 is moved by a portion of the turbine rotor 104 as the turbine rotor 104 rotates. As shown in FIG. 1A, an outer edge 130 of the gear 128 may be proximate an edge of the turbine rotor 104. In one embodiment, the gear 128 engages the turbine rotor 104 with a traditional gear and/or transmission device capable of transferring rotation to the gear 128.

In an additional or alternative embodiment, the gear 128 may be a magnetic gear. The magnetic gear is a gear that moves in response to a magnetic force between the turbine rotor 104 and the magnetic gear. At least one of the gear 128 and/or the proximate portion of the turbine rotor 104 may be magnetized. Thus, as the turbine rotor 104 rotates proximate the gear 128 the magnetic force moves the gear 128 in response to the turbine rotor 104 rotation. The magnetic gear allows the turbine rotor 104 to rotate the gear 128 without any friction between the two components.

FIG. 3 shows the magnetic gear according to one embodiment. A rotor gear component 300 may protrude from the outer surface of the turbine rotor 104. The rotor gear component 300 may extend beyond the outer diameter of the turbine rotor 103 and rotate with the turbine rotor 104. As shown, the rotor gear component 300 is a plate extending around an outer diameter of the turbine rotor 104; however, it should be appreciated that any suitable configuration for the rotor gear component 300 may be used. The gear 128 may include one or more gear wheels 302 which extend from the gear to a location proximate the rotor gear component 300. As shown in FIG. 3, there are two gear wheels 302 which are located above and below a portion of the rotor gear component 300. As the turbine rotor 104 rotates, the rotor gear component 300 rotates. A portion of the rotor gear component 300 may pass in between two portions of one or more gear wheels 302. Any of the rotor gear component 300, and the one or more gear wheels 302 may be magnetized. The type of magnet used to produce the magnetic force for the magnetic gear may be any magnet described herein. The magnetic force between the components of the magnetic gear move the gear 128, thereby generating electricity and/or power in the generator 112.

The generators 112 may be located at various locations proximate the turbine rotor 104. FIG. 1B shows three generators 112 located around the perimeter of the turbine rotor 104. It should be appreciated that any suitable number of generators 112 may be used around the perimeter of the turbine rotor 104. Further, the generator 112 may be located at other locations proximate the turbine rotor including, but not limited to, proximate the shaft 102 of the turbine rotor, in line with the axis 102 above and/or below the turbine rotor 104, and the like.

The generator 112 may be any suitable generator for converting mechanical energy into power including, but not limited to, electric generators, motors, linear generators, and the like.

In one embodiment, one or more of the generators 112 is a linear synchronous motor (LSM). The LSM motor may advance the turbine support 120 and may double as a braking system.

The power generated by the generator may be fed directly to a power grid. Further, it should be appreciated that the power may alternatively or additionally be used on site or stored. The stored power may be used at a later date when demand for the power is higher. Examples of power storage units include, but are not limited to, batteries and generating stored compressed air, a flywheel system, a magnetically levitated flywheel system, hydraulic accumulators, capacitors, super capacitors, a combination thereof, and the like.

The one or more magnets 110 reduce and potentially eliminate friction between the turbine rotor 104 and the turbine support 106. This friction reduction allows the scale of the wind turbine 100 to be much larger than a conventional wind turbine. In a conventional wind turbine the larger the wind turbine, the more friction is created between the moving parts. The amount of friction eventually limits the effective size of a conventional wind turbine. In one example, the wind turbine may have an outer diameter of 1000 ft. In a preferred embodiment, a fixed wind turbine 200, as shown in FIG. 2, has an outer diameter of about 600 ft. and is capable of producing more than 1 GWh of power. A smaller portable wind turbine 304, shown in FIG. 3, may be adapted to transport to remote locations. The portable version may have a diameter of greater than 15 ft. and a height of greater than 15 ft. In a preferred embodiment, the portable version has an outer diameter of about 30 ft. and a height of about 25 ft. and is capable of producing 50 MWh of power. It should be appreciated that the size and scale of the wind turbine may vary depending on a customers need. Further, it should be appreciated that more than one wind turbine may be located on the same portable transports system, and/or at one fixed location.

Although, the overall size of the wind turbine 100 may be much larger than a traditional wind turbine, the amount of power one wind turbine 100 produces is much larger than a traditional wind turbine. Therefore, the total land use required for the wind turbine 100 may be reduced over that required for a traditional wind farm.

The embodiment shown in FIG. 2 shows the fixed wind turbine 200, according to one embodiment. The fixed wind turbine 200 may have a turbine support 106 which extends over the turbine rotor 104. The one or more magnets 110 may be on an upper portion 201 of the turbine support 106 in addition to the locations described above.

The fixed wind turbine 200 may include an interior access way 202, according to one embodiment. It should be appreciated that any of the wind turbines 100, 200 and 304 may include an interior access way 202. The interior access way 202 allows a person to access the interior of the turbine support 106. The interior access way 202 may extend above and/or below the turbine rotor 104 in order to give the person access to various locations in the fixed wind turbine 200. The interior access way 202 may allow a person to perform maintenance on the magnets 110 and other components of the wind turbine 100, 200, and 304. Further, the interior access way 202 may have a means for transporting persons up and down the interior access way 202. The means for transporting persons may be any suitable item including, but not limited to, an elevator, a cable elevator, a hydraulic elevator, a magnetic elevator, a stair, a spiral staircase, an escalator, a ladder, a rope, a fireman pole, a spiral elevator, and the like. The spiral elevator is an elevator that transports one or more persons up and down the interior access way 202 in a spiral fashion around the interior of the interior access way 202. For example, the spiral elevator may travel in a similar path to a spiral staircase. The elevator and/or spiral elevator may use magnetic levitation to lift the elevator up and down.

The upper portion 201 of the turbine support 106 may include an observation deck 204. The observation deck 204 may extend around the perimeter of the wind turbine 100, 200 and/or 304, thereby allowing a person to view the surrounding area from the observation deck 204. The observation deck 204 may also serve as a location for an operator to control various features of the wind turbine, as will be discussed in more detail below.

The upper portion 201 of the turbine support 106 may further include a helipad 206. The helipad 202 allows persons to fly to the wind turbine 100, 200, and/or 304 and land a helicopter (not shown) directly on the wind turbine. This may be particularly useful in remote locations, or locations with limited access including, but not limited to, the ocean, a lake, a industrial area, a tundra, a desert, and the like.

The upper portion 201 of the turbine support 106 may further have one or more cranes 208. The cranes 208 allow an operator to lift heavy equipment. The crane 208 may be a tandem crane capable of rotating around the diameter of the wind turbine. The crane may assist in the construction of the wind turbine 100.

Figure 4:
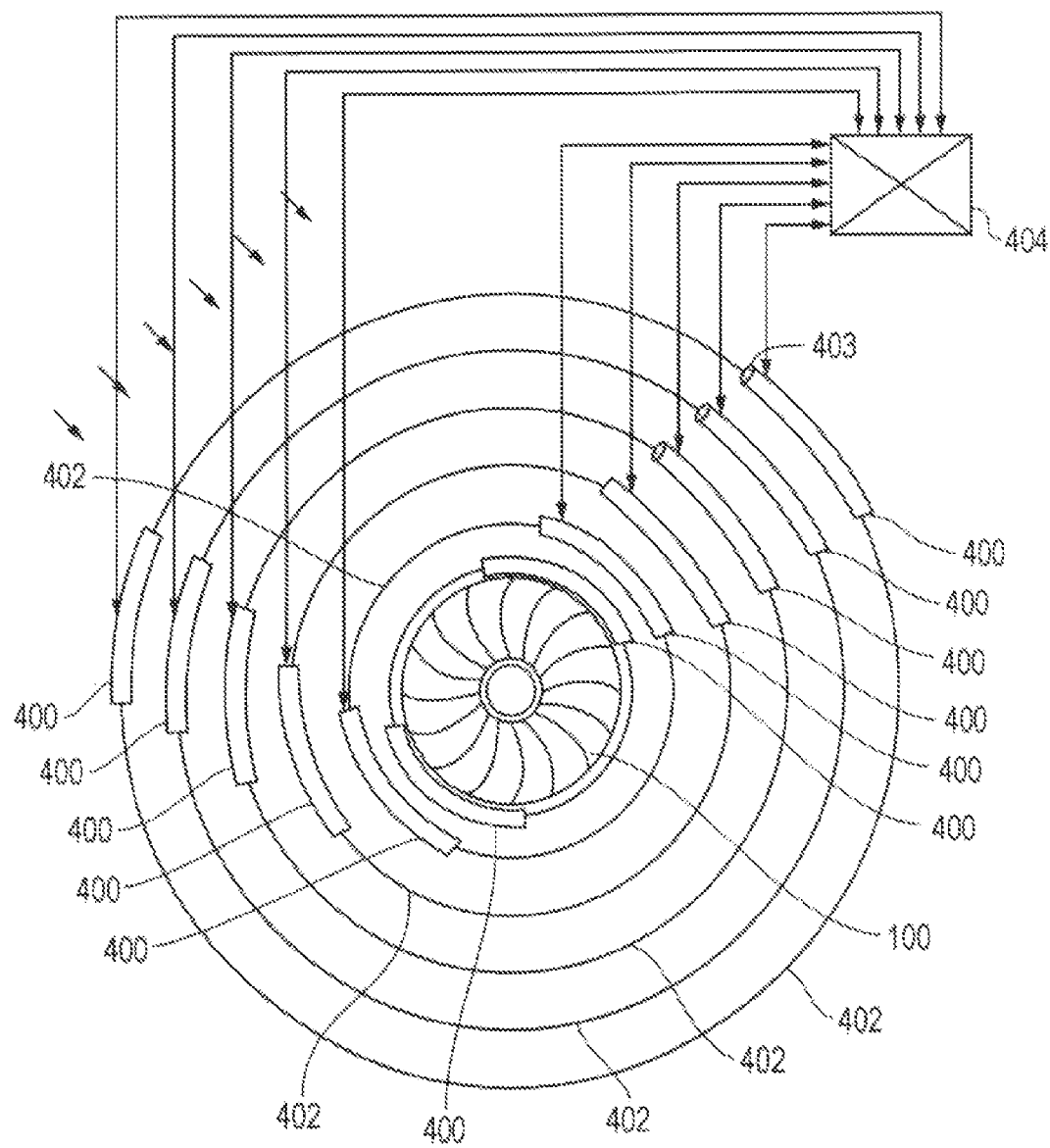
FIG. 4 is a schematic top view of a wind turbine with wind compressors according to one embodiment of the present invention.
Figure 5:
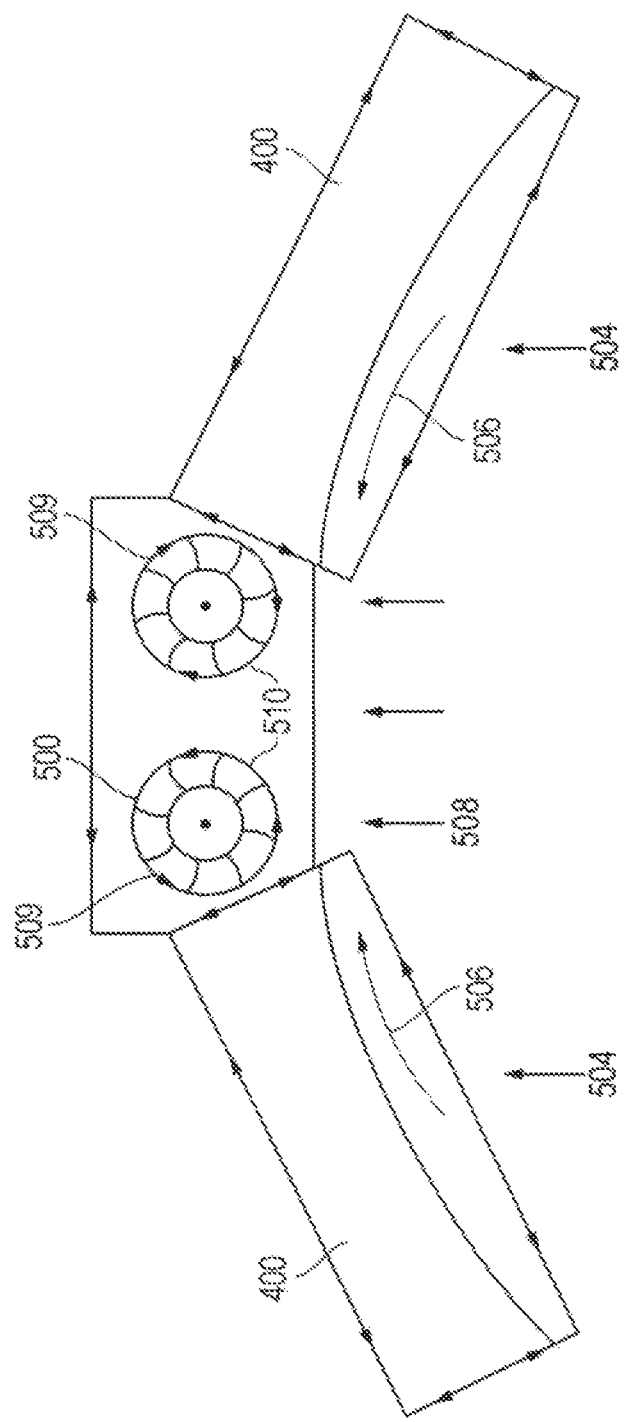
FIG. 5 is a schematic top view of wind turbines with wind compressors according to one embodiment of the present invention.

FIG. 4 shows a top view of the wind turbine 100 in conjunction with one or more wind compressors 400. The wind compressors 400 are each an obstruction configured to channel the wind toward the wind turbine 100. As illustrated in FIG. 5, a wind compressor 400 is positioned on either side of the wind turbine 500 so as to redirect the flow of wind towards the wind turbine 500. The wind compressor 400 funnels the wind 506 into the wind turbine 500. The convergence of the winds towards the wind turbine 500 creates a Venturi effect thereby increasing the speed and force of the winds upon the wind turbine 500. This Venturi effect on the wind turbines increases the rpms or rotation speed of the rotors which translates into increased electrical energy produced by the generators 112 (FIG. 1A). This increase in wind energy and force upon the turbine blades 108 is thus translated from the wind turbine 500 to the generator 112 resulting in an increased output of electricity. This invention 400 increases the efficiency and ultimate output of the wind turbine 100, 500 up to, beyond 1000-2000 megawatts (MGW) per hour or 1 gigawatt (GW) per hour. Known wind turbines produce between 2-4 MGW/hour.

The wind compressor 400 may be any suitable obstruction capable of re-channeling the natural flow of wind towards the wind turbines 100, 400. Suitable wind compressors include, but are not limited to, a sail, a railroad car, a trailer truck body, a structure, and the like. Structurally the obstructions comprise a shape and size to capture and redirect a body of wind towards the wind turbine. In one embodiment an obstruction such as a sail, which comprises a large area in two dimensions but is basically a flat object, must be anchored to avoid displacement by the force of the wind. Other obstructions, such as the rail road car or trailer truck, should have enough weight to avoid wind displacement.

Each of the wind compressors 400 may be moveably coupled to a transporter 403, or transport device to move the compressor 400 to a location or position that captures the wind flow as the direction of wind changes and directs the wind flow towards the wind turbine. The transporter may be any suitable transporter 403 capable of moving the wind compressor 400 including, but not limited to, a locomotive to move a rail car, an automobile, a truck, a trailer, a boat, a Sino trailer, a heavy duty self-propelled modular transporter 403 and the like. Each of the transporters 403 may include an engine or motor capable of propelling the transporter 403. The location of each of the wind compressors 400 may be adjusted to suit the prevailing wind pattern at a particular location. Further, the location of the wind compressors 400 may be automatically and/or manually changed to suit shifts in the wind direction. To that end, the transporter 403 may include a drive member for moving the transporter 403. The transporter 403 may be in communication with a controller, for manipulating the location of each of the transporters 403 in response to the wind direction. A separate controller may be located within each of the transporters 403.

One or more pathways 402, shown in FIG. 4, may guide transporters 403 as they carry the wind compressors 400 to a new location around the wind turbine 100. The one or more pathways 402 may be any suitable pathway for guiding the transporters including, but not limited to, a railroad, a monorail, a roadway, a waterway, and the like. As shown in FIG. 4, the one or more pathways 402 are a series of increasingly larger circles which extend around the entire wind turbine 100. It should be appreciated that any suitable configuration for the pathways 402 may be used. As described above, the size of the wind turbine 100 may be greatly increased due to the minimized friction between the turbine rotor 104 and the turbine support 106. Thus, the pathways 402 may encompass a large area around the wind turbine 100. The wind compressors 400 as a group may extend out any distance from the wind turbine 100, only limited by the land use in the area. Thus, a large area of wind may be channeled directly toward the wind turbine 100 thereby increasing the amount of wind engaging the blades 108.

In one aspect of this invention, the controller may be a single controller 404 capable of controlling each of the transporters 403 from an onsite or remote location. The controller(s) 404 may be in wired or wireless communication with the transporters 403. The controller(s) 404 may initiate an actuator thereby controlling the engine, motor or drive member of the transporter 403. The controller(s) may comprise a central processing unit (CPU), support circuits and memory. The CPU may comprise a general processing computer, microprocessor, or digital signal processor of a type that is used for signal processing. The support circuits may comprise well known circuits such as cache, clock circuits, power supplies, input/output circuits, and the like. The memory may comprise read only memory, random access memory, disk drive memory, removable storage and other forms of digital memory in various combinations. The memory stores control software and signal processing software. The control software is generally used to provide control of the systems of the wind turbine including the location of the transporters 403, the blade direction, the amount of power being stored versus sent to the power grid, and the like. The processor may be capable of calculating the optimal location of each of the wind compressors based on data from the sensors.

One or more sensors 310, shown in FIGS. 3 and 5, may be located on the wind turbines 100, 200, 304 and/or 500 and/or in the area surrounding the wind turbines. The sensors 310 may detect the current wind direction and/or strength and send the information to a controller 312. The sensors 310 may also detect the speed of rotation of the turbine rotor 104. The controller 312 may receive information regarding any of the components and/or sensors associated with the wind turbines. The controller 312 may then send instructions to various components of the wind turbines, the wind compressors and/or the generators in order to optimize the efficiency of the wind turbines. The controller 312 may be located inside the base of the tower, at the concrete foundation, a remote location, or in the control room at the top of the tower.

It should be appreciated that the wind compressors may be used in conjunction with any number and type of wind turbine, or wind farms. For example, the wind compressors 400 may be used with one or more horizontal wind turbines, traditional vertical wind turbines, the wind turbines described herein and any combination thereof.

FIG. 5 shows a schematic top view of two wind compressors 400 used in conjunction with multiple wind turbines 500. The wind compressors 400 are located on two sides of the wind turbines 500. The wind turbines 500 represent any wind turbine described herein. The wind compressors 400 engage wind 504 which would typically pass and not affect the wind turbines 500. The wind 504 engages the wind compressors 400 and is redirected as a directed wind 506. The directed wind 506 leaves the wind compressor 400 at a location that optimally affects at least one or the wind turbines 500. The wind compressors 400 may shield a portion of the wind turbines 500 from an engaging wind 508 in order to increase the affect of the wind on the wind turbines 500. The engaging wind 508 is the wind that would directly engage the wind turbines 500. For example, the wind compressors 400 shown in FIG. 5 shield a portion 509 of a vertical wind turbine which would be moving in the opposite direction to the wind 504. The redirected wind 506 and the engaging wind 506 then engage an upstream side 510 of each of the wind turbines 500. This arrangement may greatly increase the effectiveness of the wind turbines 500.

Although the wind compressors 400 are shown on each side of the wind turbines 500, it should be appreciated that any arrangement that increases the productivity of the wind turbine 500 may be used.

Figure 6:
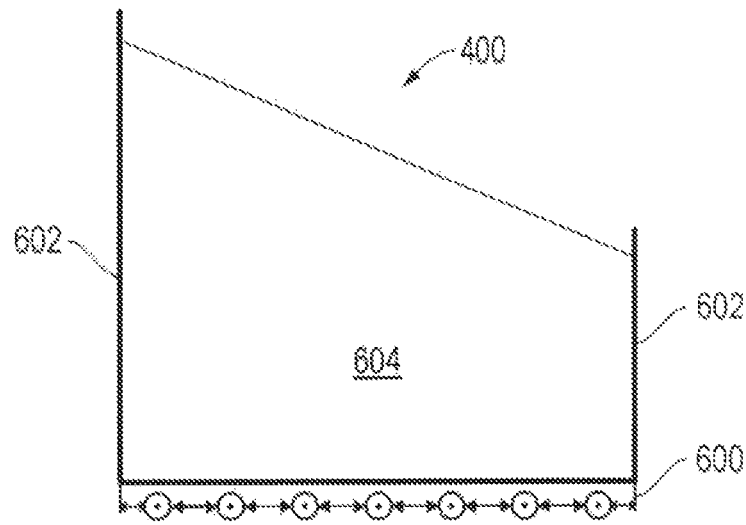
FIG. 6 is a front view of a wind compressor according to one embodiment of the present invention.
Figure 7:
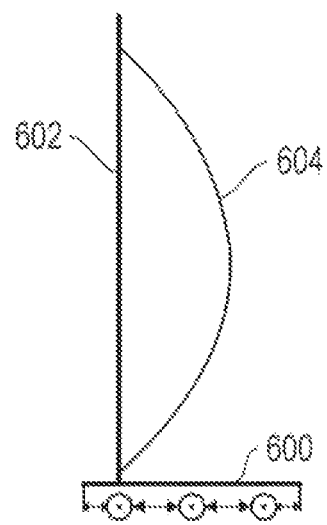
FIG. 7 is a side view of a wind compressor according to one embodiment of the present invention.

FIG. 6 shows a front view of the wind compressor 400 according to one embodiment. The transporter supporting the wind compressor is shown as a trailer 600. The trailer supports a rigging 602. The rigging 602 supports a sail 604. FIG. 7 shows a side view of the wind compressor 400, according to one embodiment. The sail 604 is full blown and shown in a mode of the wind engaging the sail 604.

The rigging 602, as shown in FIGS. 6 and 7 includes multiple poles extending in a substantially vertical direction from the transporter. The multiple poles are configured to couple to the sail 604. The poles may couple to the sail 604 proximate two sides of the sail 604. In one embodiment, two poles may be spaced apart from one another in order to allow the sail to extend a large distance between the poles. As shown, the poles vary in height; however, it should be appreciated that any arrangement of the poles may be used. Further, the rigging may be any suitable structure capable of supporting the sail 604.

The sail 604 is any suitable surface intended to deflect wind. As shown, the sail is a flexible material held by the rigging. The flexible material may be any flexible material including, but not limited to, a canvass, a cloth, a polycarbon, a metal, a glued and molded sail, a mylar, and the like. Further, the sail may be a solid non-flexible material which deflects wind that engages the sail. The non-flexible material may not require the rigging.

Preferred methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

The invention claimed is:

1. A wind compressor system comprising:
   at least one wind turbine, said at least one turbine having at least one rotor and at least one magnet, said at least one magnet, in operation of said at least one turbine, magnetically levitating said at least one rotor;
   at least one wind compressor arranged about said at least one wind turbine, and obstructing and redirecting ambient wind striking said at least one wind compressor to said at least one wind turbine;
   at least one transporter connected to said at least one wind compressor, whereby said at least one wind compressor is repositionable using said at least one transporter; and
   a controller, said controller configured to monitor the position of said at least one wind compressor relative to the position of said at least one wind turbine,
   wherein said redirected ambient wind turns blades of at least one rotor within said at least one wind turbine,
   whereby, through magnetic levitation of said at least one rotor of said wind turbine, operational friction is reduced.

2. The wind compressor system according to claim 1, wherein said controller is configured to adjust the position of said at least one wind compressor based upon the direction of said ambient wind.

3. The wind compressor system according to claim 2, wherein said controller automatically changes the position of said at least one wind compressor to another position to optimally harness the ambient wind.

4. The wind compressor system according to claim 2, wherein said at least one wind compressor comprises at least two wind compressors, said controller changing the position of one of said at least two wind compressors to better harness the ambient wind.

5. The wind compressor system according to claim 2, further comprising:
   at least one sensor, connected to said controller, to detect said direction of the ambient wind.

6. The wind compressor system according to claim 1, wherein said at least one transporter moves said at least one wind compressor from one position to another position relative to the ambient wind.

7. The wind compressor system according to claim 6, wherein each of said at least one wind compressor is affixed to a respective transporter.

8. The wind compressor system according to claim 6, wherein said at least one transporter is selected from the group consisting of an engine, a locomotive, an automobile, a truck, a trailer, a boat, a Sino trailer, a self-propelled modular device and combinations thereof.

9. The wind compressor system according to claim 6, further comprising:
   at least one pathway for said at least one transporter.

10. The wind compressor system according to claim 9, wherein said at least one pathway is selected from the group consisting of a track, a railroad, a monorail, a roadway, a waterway and combinations thereof.

11. The wind compressor system according to claim 6, wherein said at least one transporter comprises a plurality of transporters, each said transporter connected to a respective wind compressor and a controller, respective transporters moving respective wind compressors from respective first positions to respective second positions.

12. The wind compressor system according to claim 1, further comprising:
   at least one generator configured to generate electric power in response to the rotation of the rotor driven by said ambient wind and the redirected wind from said at least one wind compressor.

13. The wind compressor system according to claim 1, wherein said wind compressor system is portable.

14. The wind compressor system according to claim 1, wherein said wind compressors are selected from the group consisting of a railroad car, a trailer truck body, a structure, a sail, a flexible material, a canvass, a cloth, a polycarbon, a metal, a glued and molded sail, mylar material, and combinations thereof.

15. The wind compressor system according to claim 1, wherein said at least one wind compressor comprises a pair of wind compressors arranged relative to the ambient wind to the left and to the right of said at least one wind turbine.

16. The wind compressor system according to claim 1, wherein said at least one wind compressor comprises a plurality of wind compressors arranged relative to the ambient wind.

17. A method for redirecting ambient wind comprising:
   arranging at least one wind compressor at a position relative to at least one wind turbine relative to ambient wind, said at least one wind compressor redirecting ambient wind to said at least one wind turbine,
   monitoring, by a controller, said said at least one wind compressor relative to the position of said at least one wind turbine,
   moving, by control of said controller, at least one of said at least one wind compressors,
   wherein ambient wind and the redirected ambient wind from said at least one wind compressor drive at least one rotor with blades affixed thereto in said at least one wind turbine, rotating said at least one rotor; and
   wherein said at least one rotor during operation is levitating pursuant to magnetic forces opposing gravity due to at least one magnet in said at least one wind turbine, thereby reducing friction.

18. The method according to claim 17, further comprising:
   reconfiguring, by said controller connected to said at least one wind compressor, said position of said at least one wind compressor based on the direction of said ambient wind.

19. A method for redirecting ambient wind comprising:
   arranging a plurality of wind compressors relative to at least one wind turbine relative to ambient wind, said at least one wind compressor redirecting ambient wind to said at least one wind turbine, monitoring, by at least one controller, said plurality of wind compressors relative to the position of said at least one wind turbine, moving, by control of said at least one controller, at least one of said plurality of wind compressors, wherein ambient wind and the redirected ambient wind from said plurality of wind compressors drive at least one rotor with blades affixed thereto in said at least one wind turbine, rotating said at least one rotor; and wherein said at least one rotor during operation is levitating pursuant to magnetic forces opposing gravity due to at least one magnet in said at least one wind turbine, thereby reducing friction.

20. The method according to claim 19, further comprising:

reconfiguring, by said at least one controller connected to said plurality of wind compressors, the position of at least one of said wind compressors based on the direction of said ambient wind.

\* \* \* \* \*